(No Model.)
S. BRADLEY.
DEVICE FOR LOADING OR UNLOADING ANIMALS.
No. 370,760. Patented Oct. 4, 1887.
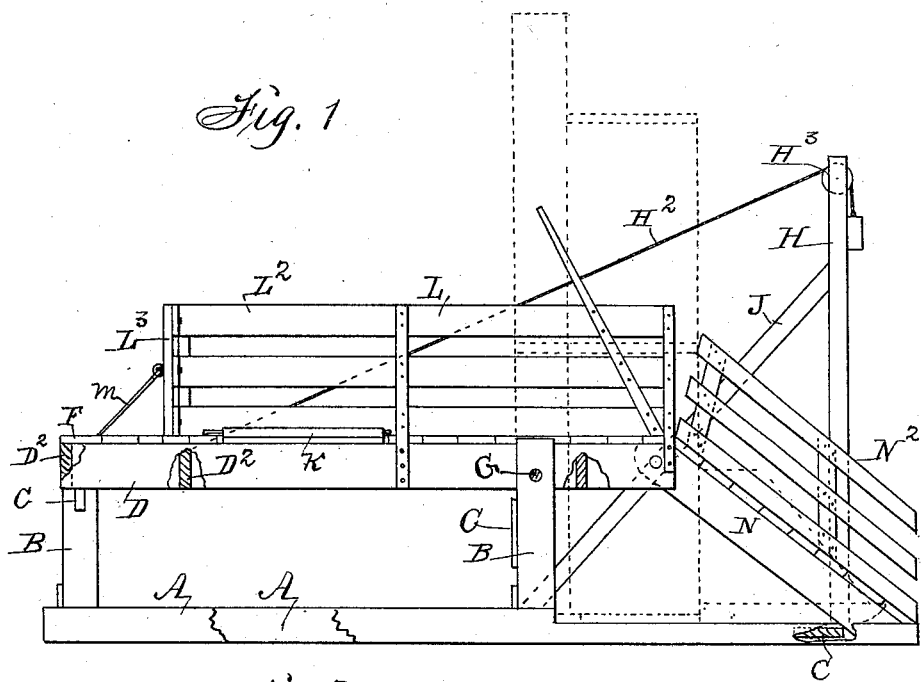
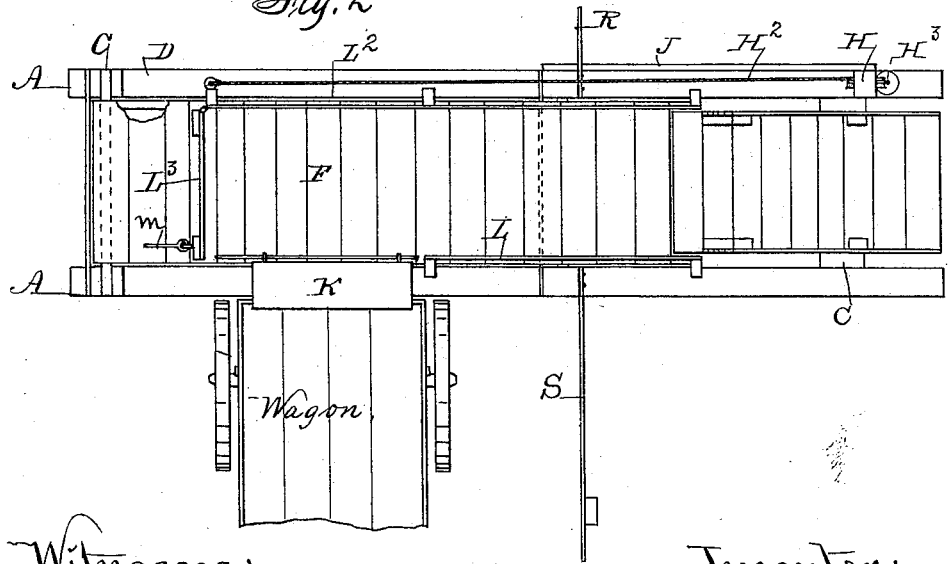

UNITED STATES PATENT OFFICE.

STEPHEN BRADLEY, OF REINBECK, IOWA.

DEVICE FOR LOADING OR UNLOADING ANIMALS.

SPECIFICATION forming part of Letters Patent No. 370,760, dated October 4, 1887.

Application filed November 8, 1886. Serial No. 218,326. (No model.)

*To all whom it may concern:*

Be it known that I, STEPHEN BRADLEY, a citizen of the United States of America, and a resident of Reinbeck, in the county of Grundy and State of Iowa, have invented a new and useful Device for Loading or Unloading Animals, of which the following is a specification.

My object is to form a connection between a wagon or car and a hog or cattle pen in such a manner that animals can be driven from the wagon or car into the pen, and vice versa, to load and unload wagons or cars in succession without seizing the animals, so that much of the labor and annoyance to persons and the frightening and bruising of animals incident to transporting them from place to place will be dispensed with.

My invention consists in the construction and combination of a tilting and fenced platform and a fenced inclined plane upon a suitable support, as hereinafter set forth, pointed out in my claims, and illustrated in the accompanying drawings, in which—

Figure 1 is a side view of the device, showing the platform in a horizontal position, with dotted lines indicating the vertical position it assumes to close entrance to a cattle-pen. Fig. 2 is a top view showing the rear end of a wagon connected with a platform, as required to drive animals from one to the other.

A A are parallel wooden sills; B, corner posts, and C cross-pieces, framed or otherwise rigidly secured together to produce a base and support for the tilting platform and the inclined plane. The platform may vary in size, as desired, and the dimensions of the base must correspond with the size of the platform.

D D are the parallel side pieces and $D^2$ the cross-pieces of the platform frame that is covered with a floor, F, from end to end.

G is a metal rod that extends through bearings formed in or fixed to the posts B, attached to the central portions of the sills A, and also through bearings formed in or fixed to the rear portions of the side pieces, D, of the platform. The platform is thus pivoted to the base, so that it can be turned into a vertical position, as indicated by dotted lines in Fig. 1, for the purpose of opening a passage-way for a wagon between the two pairs of posts B, fixed to the sills A, and also for the purpose of closing a passage-way for animals extended from the pivoted platform to the hog or cattle pen.

H is a post fixed to the base or in the ground in such a position relative to the pivoted platform that a rope, $H^2$, attached to the front end of the platform, can be passed over a pulley, $H^3$, at the top of the post and a weight attached to the end of the rope to balance the platform and facilitate raising and lowering the platform.

J is a brace that extends from the post H to one of the posts B.

K is a floor-section hinged to the edge of the pivoted platform in such a manner that it can be turned in upon that platform and also turned outward upon the floor of a wagon-box, as shown in Fig. 2, to bridge any open space that may exist between the platform and wagon, as required to make a secure passage-way for animals that are to be driven from one to the other.

L is a short panel of fence fixed to the side and top of the pivoted platform to extend rearward from the hinged floor section or bridge K.

$L^2$ is a long panel on the opposite side of the platform.

$L^3$ is a gate hinged to the front end of the panel $L^2$, to swing across the end portion of the platform.

m represents a prop or gate-fastening device hinged to the gate in such a manner that the prop can be set upon the floor of the platform to support the gate when it is extended across the platform to prevent animals from jumping from the platform as they are driven over the platform in going to and from a wagon.

N represents an inclined plane that has panels of fencing, $N^2$, fixed to its opposite sides, hinged to the rear end of the pivoted platform in such a manner that when the platform is in a horizontal position the plane will be in position as required to allow animals to pass up or down over it, and when the platform is in a vertical position the inclined plane will be in a horizontal position, as indicated by dotted lines in Fig. 1. The inclined plane thus hinged to the pivoted platform serves as a counterpoise to aid in adjusting the platform and in keeping it in a vertical position.

R and S represent panels of fence or sections of the walls of an inclosure or stock-yard extending in opposite directions from the opposite sides of my tilting platform.

In the practical use of my invention when connected with an inclosure or stock-yard, I turn it into a vertical position to close the pen or inclosure, and to transfer hogs or other animals from the inclosure to a wagon, or vice versa, I place the wagon in position as shown in Fig. 2, and then bring the platform into a horizontal position and adjust the gate L³ and bridge K, so that animals can readily pass over and through my device.

I am aware that the end of a chute or platform has been hinged to a fixed or stationary inclined plane, so that it could be turned into a vertical position; but my manner of pivoting a platform at some distance from its end and hinging an inclined plane to the end of the pivoted platform is greatly advantageous, in that the weight of the inclined plane aids in balancing and operating the platform as required to connect and disconnect the complete device with a wagon, car, or truck upon which animals may be carried to and from the dump.

I claim as my invention—

1. The combination of a base or support and a platform having panels at its sides pivoted to said support, with an inclined plane having panels at its sides hinged to said platform, substantially as described.

2. A base or support, a platform having panels L and L², and hinged bridge K on its sides and gate L³ at one end and pivoted to the base near the opposite end, and an inclined plane having panels at its sides hinged to the pivoted end of the platform, the parts being combined substantially as described.

STEPHEN BRADLEY.

Witnesses:
JOHN WILSON,
T. A. PIERCE.